(12) United States Patent
Donners (10) Patent No.: US 8,541,949 B2
(45) Date of Patent: Sep. 24, 2013

(54) ANIMAL-ADAPTED ILLUMINATION METHOD AND SYSTEM

(75) Inventor: Maurice Alexander Hugo Donners, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 233 days.

(21) Appl. No.: 13/062,983

(22) PCT Filed: Sep. 16, 2009

(86) PCT No.: PCT/IB2009/054047
§ 371 (c)(1),
(2), (4) Date: Mar. 9, 2011

(87) PCT Pub. No.: WO2010/035175
PCT Pub. Date: Apr. 1, 2010

(65) Prior Publication Data
US 2011/0163694 A1  Jul. 7, 2011

(30) Foreign Application Priority Data
Sep. 23, 2008 (EP) .................................... 08164884

(51) Int. Cl.
*G08B 19/00* (2006.01)
*H05B 37/02* (2006.01)
(52) U.S. Cl.
USPC ........ 315/129; 315/307; 315/297; 340/573.1; 340/573.3

(58) Field of Classification Search
USPC ........ 315/129, 130, 133, 297, 307; 340/521, 340/541, 565, 573.1–573.3, 384.2, 384.5
See application file for complete search history.

(56) References Cited

U.S. PATENT DOCUMENTS

| 4,965,552 | A | 10/1990 | Price | |
|---|---|---|---|---|
| 2002/0109588 | A1* | 8/2002 | Faye | 340/426 |
| 2004/0212500 | A1* | 10/2004 | Stilp | 340/541 |
| 2008/0224849 | A1* | 9/2008 | Sirhan | 340/521 |

FOREIGN PATENT DOCUMENTS

WO  2005081227 A1  9/2005

OTHER PUBLICATIONS

Raghuram, H. et al "Donald Redfield Griffin: The Discovery of Echolocation", Resonance, Feb. 2005, pp. 20-32.
Joshi, D. et al Spectral Sensitivity of the Photoreceptors Responsible for Phase Shifting the Circadian Rhythm of Activity in the Bat, Hipposideros Speoris, J.Comp Physiol A, 1985, vol. 156, pp. 189-198.
Rich and Longcore, Ecological Consequences of Artificial Night Lighting, Island Press, 2006, pp. 1-13.
Winter, Y. et al, "Ultraviolet Vision in a Bat", Nature, vol. 425, Oct. 2003, pp. 612-614.
Wang, D. et al "Molecular Evolution of Bat Color Vision Genes" Molecular Biology and Evolution, vol. 21, No. 2, 2004, pp. 295-302.

* cited by examiner

*Primary Examiner* — Daniel D Chang (57) ABSTRACT

An illumination method includes emitting light suitable for providing illumination for human activities; detecting an animal indication signal indicative of the presence of an animal; and temporarily changing at least one property of the light in response to the detected presence of the animal.

15 Claims, 6 Drawing Sheets

ANIMAL-ADAPTED ILLUMINATION METHOD AND SYSTEM

FIELD OF THE INVENTION

The present invention relates to an illumination method and a control device for controlling an illumination system to perform the illumination method. The present invention further relates to a computer program module.

BACKGROUND OF THE INVENTION

In today's modern society, artificial outdoor lighting is increasingly used in poor natural lighting conditions, such as during night time, for various purposes, such as for increasing public safety, improving safety in traffic situations or enabling outdoor work to take place at night time.

Although providing benefits for humans, the abundant artificial outdoor lighting may have detrimental effects on animals, especially wild animals.

In particular crepuscular and/or nocturnal animals have been shown to react negatively on artificial lighting. An overview of the various effects is given in the book: 'The ecological consequences of artificial night lighting', edited by Rich and Longcore (Island Press, 2006, page 1-13).

One particular example of species which are affected by artificial lighting are various species of bats. Most bat species are considered to be endangered, featuring on both national and international red lists. Therefore bats are protected by a range of treaties and laws, from a global to a national level, e.g. by the international Bats Agreement, also known as the 'Bonn Convention'.

Bats are known to avoid intense lighting. When the light levels outside their roosts is too high, they won't emerge, they will avoid 'well' lit areas and will not pass rows of outdoor lighting lamps forming a continuous band of light in the landscape, which in this way can block routes from living to hunting areas, severely limiting the available habitat for the bats.

Other species are also expected to be affected by excessive artificial outdoor lighting at night time.

However, drastically reducing outdoor artificial lighting during night time is not expected to be feasible, due to the positive aspects of the artificial lighting mentioned initially.

SUMMARY OF THE INVENTION

In view of the above-mentioned and other drawbacks of the prior art, a general object of the present invention is to provide an improved method and device for controlling the properties of light output by a light-output device, and in particular a method and device enabling control of the properties of the output light in response to the presence of an animal.

According to a first aspect of the present invention, these and other objects are achieved through an illumination method, comprising the steps of: emitting light suitable for providing illumination for human activities; detecting an animal indication signal indicative of the presence of an animal; temporarily changing at least one property of the light in response to the detected presence of the animal.

By "light suitable for providing illumination for human activities" should be understood light that is perceived as giving sufficient illumination for various human-populated environments, such as, low speed urban roads, like residential streets, pedestrian streets in villages and city centers, bike paths, parking places, schoolyards, emergency lanes and paths in parks and gardens etc. For example, the light may exhibit lighting levels that adhere to the S-classes for road lighting, meaning that light levels may advantageously lie between 10 1× (class S2), and 3 1× (S5). In practice, the intermediate class S4 (5 1×) is often used. Furthermore, user tests indicate that many humans prefer white light rather than yellowish light.

The "animal indication signal" may be any kind of signal which indicates the presence of an animal. In particular, the signal may be an electromagnetic signal, such as a radio signal, or an optical signal, a shockwave signal that may be transmitted through the ground, or a pressure signal, such as an acoustic signal.

Furthermore, the "animal indication signal" may be acquired in response to an emitted signal, or may be acquired without the previous emission of any signal.

Furthermore, the property/properties of the emitted light that are temporarily changed may be one or several of any suitable properties of the light, such as the intensity of the light, the frequency distribution of the light, the spatial distribution of the light, the modulation of the light (amplitude modulation and/or flicker frequency), the polarization of the light, or any combination thereof.

The present invention is based on the realization that a beneficial compromise between the desire for efficient illumination in modern "human" society and a limited impact on the natural behavior of various animals can be achieved by detecting the presence of an animal and temporarily changing at least one property of the emitted light in response thereto.

The animal indication signal that is detected may be a signal generated by the animal, which may be advantageous since the use of a passive detector is thereby enabled. Various types of signals are generated by animals, including electromagnetic signals (such as IR-radiation) and acoustic signals. Many animals are known to emit characteristic acoustic signals either in the form of audible sound or ultrasound. Examples of animals that generate ultrasound are certain sea-living creatures, such as dolphins and whales, insects, rodents, frogs, birds and bats.

By detecting an acoustic signal having been generated by the animal, the detection of animals may be improved. For example, the detection of small animals, such as birds or bats, may be improved, as well as the detection of animals being "out of sight", such as behind an object, such as a tree or shrubs.

In particular, an ultrasonic signal may advantageously be detected, whereby the determination of at least some species of animals can be greatly facilitated. Moreover, the amount of "noise" is generally lower in the ultrasonic regime than in the audible frequency range, which facilitates the discrimination of the animal indication signal.

According to one embodiment, the step of detecting the animal indication signal may comprise the steps of acquiring a signal; comparing the signal with a predetermined set of characteristics indicating the presence of an animal; and in case of a match between the signal and the predetermined set of characteristics, classifying the signal as an animal indication signal.

The predetermined set of characteristics may include any characteristic useable for identifying the signal as an animal indication signal.

In a simple exemplary embodiment one characteristic may a variation from the average of one or several properties of acquired signals. A "match" may then occur if the currently acquired signal has one or several properties that differs from the average thereof by more than a predetermined value. Such properties may include, for example, signal frequency, repetition frequency, intensity, duration, variance, etc.

For example, the variation over time of one or several of the above-mentioned or other properties may form a characteristic pattern for an animal, or group of animals.

In another exemplary embodiment, the set of characteristics may be indicative of the presence of a particular set of animal species; and the step of classifying may comprise classifying the signal as an animal indication signal indicative of the presence of an animal belonging to that particular set of animal species.

According to one concrete example, the approach or presence of bats can be detected by identifying the characteristic ultrasound echolocation. The ultrasound ecolocation signals typically consist of periodic frequency sweeps, for example, each two seconds a one second long sweep, which may range from 100 kHz to 25 kHz. Typical examples of such characteristic signals are given in Raghuram and Marimutu, "Donald Redfield Griffin, the discovery of echolocation", Resonance, February 2005, pages 20-32.

According to another example, the approach of birds can be detected by sensing the characteristic ultrasound signals produced by the flapping of their wings.

Moreover, the acquired signal may be compared with the characteristic(s) in the predetermined set directly, or following conditioning of the acquired signal. For example, the acquired signal may be converted from the time domain to the frequency domain, and/or the frequency of the signal may be downconverted to facilitate the analysis thereof.

To increase human acceptance of changing illumination properties due to animal presence, the method may further comprise the step of displaying information about the detected animal species/set of species. Such information may, for example, include an image, general information, a sound representation etc.

Of course, the displayed information need not correspond exactly to the animal which is actually present. For example, the information may relate to a group of species, an alternative species or a "generic" animal of the relevant type.

A straight-forward way of changing the illumination light in response to the detection of the presence or approach of an animal may be to simply change the intensity of the light. The intensity of the light may temporarily be lowered to so as not to repel approaching animals and thereby reducing their natural habitat.

Alternatively, the intensity of the light may be temporarily increased in order to prevent animals from entering environments that may be dangerous to them, such as heavily trafficked motorways, or airport runways.

When, however, information regarding the species of animal can be determined, other properties of the light can be changed to achieve a more favorable compromise between the human desire for efficient illumination and the effect of the light on the particular species of animal(s).

For example, the color point of the light may be changed based on knowledge about the spectral sensitivities of the photoreceptors of the particular animal species. For instance, it is known that, for at least some bat species, the spectral sensitivities of the photoreceptors have maxima ranging from 350 to 520 nm for the short wavelength receptor and ranging from 509 to 565 nm for the medium wavelength receptor. It is also known that the circadian rhythm of activity of bats is controlled by the same photoreceptors (Joshi, J. Comp. Physiol. A (1985) 156:189-198, Winter et al. Nature, vol. 425, 9 Oct. 2003, page 612-614; Wang et al., Mol. Biol. Evol. 21(2):295-302, 2004).

Obviously, similar data is available for other animal species as well.

Moreover, the step of temporarily changing the at least one property of the light may be performed only within predetermined time periods depending on an expected level of human activity within an illuminated area.

In this way, the compromise between human safety and the effect that artificial illumination has on animals can be skewed such that changing of the light in response to the detected presence of an animal only takes place in time periods when human activity in the illuminated area is known to be relatively low.

Alternatively, or in combination with the measures detailed above, detected signals may be analyzed to determine the amount of human activity (pedestrians, cyclists, motor vehicles, etc.) and prevent changing of the light in response to the detected presence of an animal for (human) safety reasons.

According to a second aspect of the present invention, the above-mentioned and other objects are achieved through a control device, connectable to at least one light-emitting device and at least one detector, the control device comprising: a memory for storing a predetermined set of characteristics indicating the presence of an animal; and processing circuitry configured to: acquire a signal detected by the detector; compare the signal with the predetermined set of characteristics; in case of a match between the signal and the predetermined set of characteristics, classify the signal as an animal indication signal; and control the light-emitting device to temporarily change at least one property of light emitted thereby in response to the animal indication signal.

The "processing circuitry" may be provided in the form of a one or several electronic components, such as one or several micro-processors.

Further variations and effects of the present second aspect of the invention are largely analogous to those described above in connection with the first aspect of the invention.

Furthermore, the control device according to the present invention may advantageously be included in an illumination system, further comprising a light-emitting device for emitting light suitable for providing illumination for human activities; and a detector for detecting an animal indication signal indicative of the presence of an animal.

In the lighting system, the control device is connected to the detector for acquiring signals detected by the detector and to the light-emitting device for controlling the light-emitting device to temporarily change at least one property of light emitted thereby in response to an animal indication signal detected by the detector.

According to one embodiment, the detector may be an ultrasound detector, for detecting ultrasonic signals emitted by the animal. In particular, the detector may be a passive ultrasound detector for detecting ultrasonic signals generated by the animal.

The illumination system may further comprise a display unit being connected to the control system and responsive to display information provided thereto by the control system. Such information may, for example, be information identifying the detected animal species.

The illumination system may be an integrated system, or may be provided in the form of separate devices interconnected by communication means, such as wiring or a wireless link, or combinations of these.

Moreover, the illumination system may comprise a plurality of individually controllable light-emitting devices and a corresponding plurality of detectors. Hereby, individual light-emitting devices can be controlled in response to the determined presence of an animal.

If, for example, the lighting system comprises a row of light-emitting devices, forming a continuous band of relatively high light levels, effectively blocking flight routes for bats, it can be sufficient to change one or several properties of the light emitted by only a number of the light-emitting devices in the row, thus creating passage ways (gates') through which the bats can continue their travel, thus mitigating the negative effect of fragmenting (cutting up) their habitat.

Additionally, the present invention provides a computer program module configured to perform the steps of the method according to the invention when run on processing circuitry comprised in the control device according to the invention.

BRIEF DESCRIPTION OF THE DRAWINGS

These and other aspects of the present invention will now be described in more detail, with reference to the appended drawings showing currently preferred embodiments of the invention, wherein.

DESCRIPTION OF A PREFERRED EMBODIMENT OF THE PRESENT INVENTION

In the following description, the present invention is mainly described with reference to an illumination system configured to change illumination conditions in response to a detected ultrasound signal indicating the presence of bats.

It should be noted that this by no means limits the scope of the invention, which is equally applicable to illumination systems configured to change illumination conditions in response to the detected presence of other animals, which may have been detected by sensing any other type of signal, such as a shockwave, an acoustic signal in the audible range, an electromagnetic signal, or a combination thereof.

Figure 1:
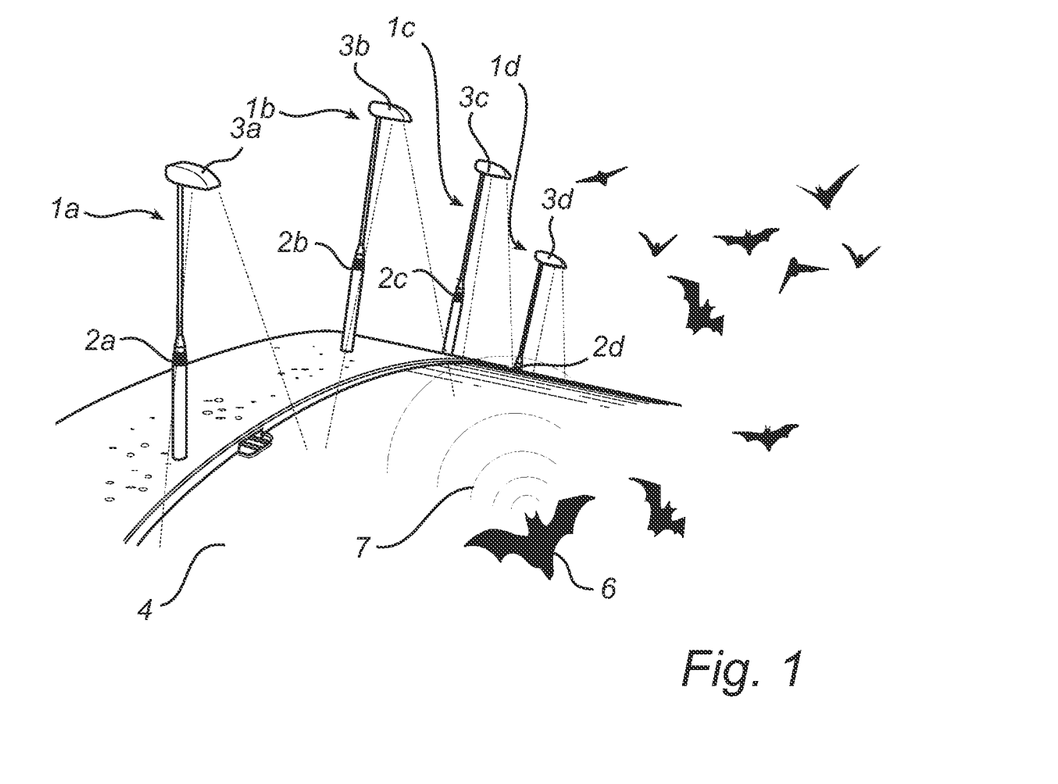
FIG. 1 schematically illustrates an exemplary application for various embodiments of the present invention.

FIG. 1 schematically illustrates a plurality of illumination systems, in the form of street-lights 1a-d. Each street-light comprises an ultrasound detector 2a-d, a light-emitting device 3a-d and a control device (not shown).

Under normal circumstances (when the presence of an animal is not detected), the light-emitting devices 3a-d comprised in the street-lights emit light having properties (intensity, color point) suitable for illumination in order to increase the public safety along the street 4 by which the street-lights 1a-d are located.

When, however, a bat 6 approaches one of the street-lights, say 1b, an ultrasound signal 7 emitted by the bat 6 is detected by the detector 3b of the street-light 1b. Upon determining the presence of the bat 6, the control device of the street-light 1b controls the light-emitting device 3b to change at least one property of the light emitted thereby to reduce the intensity of the light as perceived by the bat 6, as will be described in more detail below with reference to FIGS. 6a-b. Hereby, the bat 6 can be prevented from being disturbed by the light and turning away.

After a predetermined period of time following the passage of the last bat to pass the adjusted street-light 1b, the control device controls the light-emitting device 3b comprised therein to return to emitting light adapted for illumination.

The general outline of the illumination system according to an exemplary embodiment of the present invention will now be described with reference to the block diagram in FIG. 2.

Figure 2:
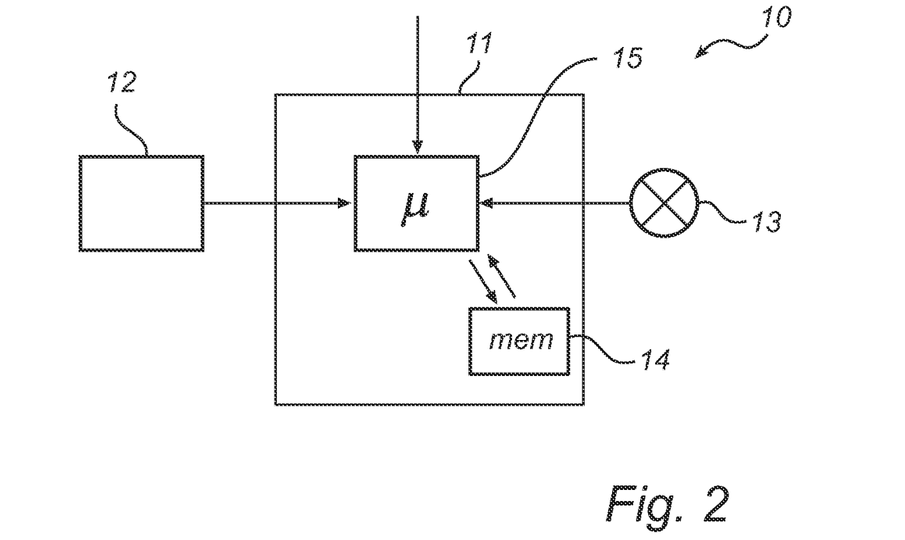
FIG. 2 is a block diagram schematically illustrating a first exemplary illumination system.

In FIG. 2, an illumination system 10 is shown, comprising a control device 11, a detector 12, and a light-emitting device 13. The control device 11 comprises a memory 14 and processing circuitry in the form of a microprocessor 15, which is connected to the detector 12 and the light-emitting device 13. As is indicated in FIG. 2, the microprocessor 15 may acquire additional signals from other sources than the detector 12. Such sources may, for example, be one or several additional detector, a database comprising various sets of animal characteristics or a communication network. Moreover, the control device 11 may additionally comprise an interface for enabling download of new software etc.

Figure 3:
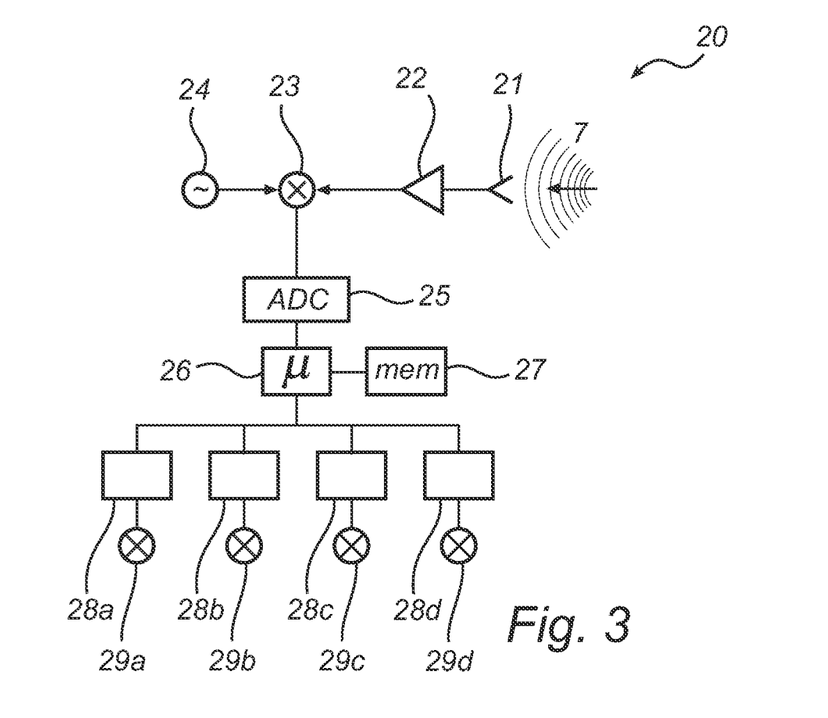
FIG. 3 is a block diagram schematically illustrating a second exemplary illumination system, in which ultrasound signals are detected.

With reference to FIG. 3, a more specific example of an illumination system 20 will now be described, in which ultrasound signals are detected.

In FIG. 3, an ultrasound signal 7 is sensed by an ultrasound sensor 21, and the sensed signal is converted to a sensed electrical signal $S_s$ having sensed frequency $f_s$. Following amplification in the (optional) signal amplifier 22, the frequency $f_s$ of the signal $S_s$ is downconverted using a mixer 23, to which a frequency generator 24 is also connected. Output from the mixer 23 is an intermediate frequency signal $S_{IF}$. The analog intermediate frequency signal $S_{IF}$ is converted to a digital signal by the analog-to-digital converter 25, the output of which is connected to the input of a microprocessor 26.

In the microprocessor 26, the digitized intermediate frequency signal is compared with a set of characteristics stored in a memory 27 which is also connected to the microprocessor 26.

The microprocessor 26 is, via driver circuits 28a-d, connected to a plurality of individually controllable light-sources 29a-d. Based upon the result of the comparison between the digitized signal and the animal characteristics stored in the memory 27, the microprocessor 26 controls the light-sources 29a-d to change one or several properties of the light emitted thereby.

The ultrasound sensor 21 may, for example be a typical piezo-based ultrasound sensor, which may be sensitive in at least the range between 40 kHz and 80 kHz. Furthermore, a sound reflecting paraboloid or cone-shaped "sound reflector" may be mounted on the ultrasound sensor 21 to optimize its spatial sensitivity characteristics.

The light-sources may, for example, be differently colored light-emitting diodes (LEDs), or may be any other kind of controllable light-source, including for example, low pressure sodium lamps, fluorescent lamps.

An embodiment of the method according to the present invention, substantially corresponding to the exemplary application described in connection with FIG. 1, will now be described with reference to the flow-chart in FIG. 4.

Although the method is mainly described with reference to the exemplary illumination system in FIG. 3, it should be noted that the method according to the invention is by no means limited to the particular embodiment of the illumination system shown in FIG. 3, but is equally applicable to other embodiments of the inventive illumination system.

In a first step 101, light suitable for providing illumination for human activities is emitted. Such light for environments, such as, low speed urban roads, like residential streets, pedestrian streets in villages and city centers, bike paths, parking places, schoolyards, emergency lanes and paths in parks and gardens, the lighting levels may preferably adhere to the S-classes for road lighting, meaning that light levels may advantageously lie between 10 1× (class S2), and 3 1× (S5). In practice, the intermediate class S4 (5 1×) is often used. Furthermore, user tests indicate that many humans prefer white light rather than yellowish light.

According to one embodiment, the white light for illumination may advantageously be achieved using a plurality of individually controllable light-sources 29a-d in FIG. 3, which may, for example, be provided in the form of high power cool white LEDs, say 29a-b, and red-orange LEDs, say 29c-d.

Figure 7A:
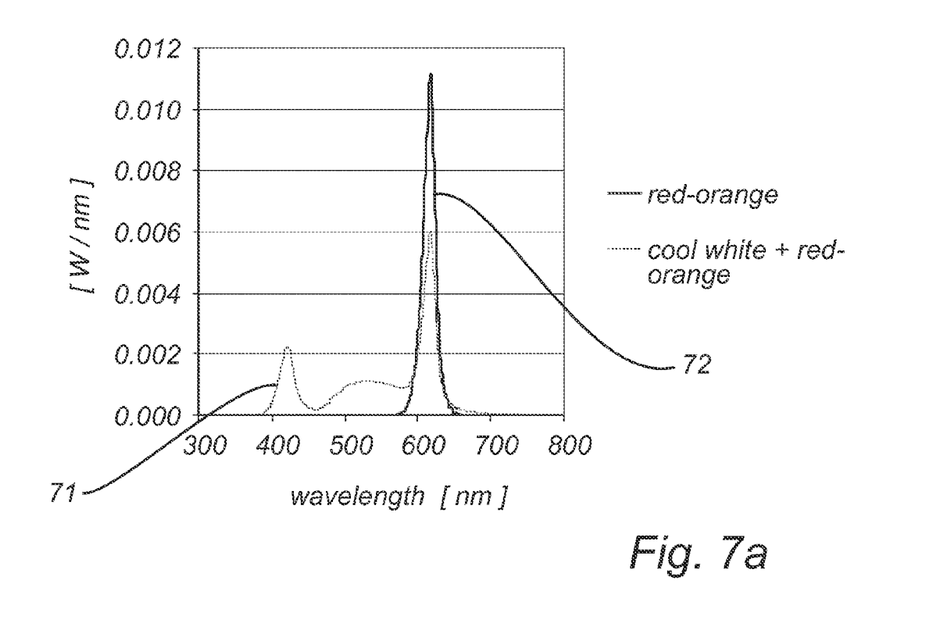
FIGS. 7a-b schematically show a change in color point in terms of spectral power distribution and location in color space, respectively.

Assuming that the white LEDs 29a-b and the red-orange LEDs 29c-d are of equal power, for instance 1 W, and that the white LEDs 29a-b are driven at full power and the red-orange LEDs 29c-d are driven at half power, the spectral power distribution indicated by the plot 71 in FIG. 7a is obtained. This spectral power distribution 71 corresponds to the color point $(x_0, y_0)=(0.452, 0.368)$, which is indicated in the color space representation 75 in FIG. 7b. Furthermore, a correlated color temperature of 2450 K and a color rendering, $R_a$ of 77 is obtained for these illumination settings.

As will be evident to the person skilled in the art, the above described combination of cool-white and red-orange LEDs is merely an example of a suitable combination of short-wavelength and long-wavelength light-sources useable for achieving light suitable for illumination for human activities. Many other combinations of short-wavelength and long-wavelength light-sources may also be used. Examples of suitable short-wavelength light-sources may include high-pressure sodium light-sources, fluorescent light-sources, etc, and examples of long-wavelength light-sources may include amber or red LEDs, low-pressure sodium light-sources, yellow to red colored fluorescent light-sources (for example using phosphors like MGM (Mn-doped Magnesium Fluor Germanate, $Mg_4GeO_{5.5}F:Mn$) or YOX (Eu-doped Yttrium Oxide, $Y_2O_3$:Eu)).

Figure 4:
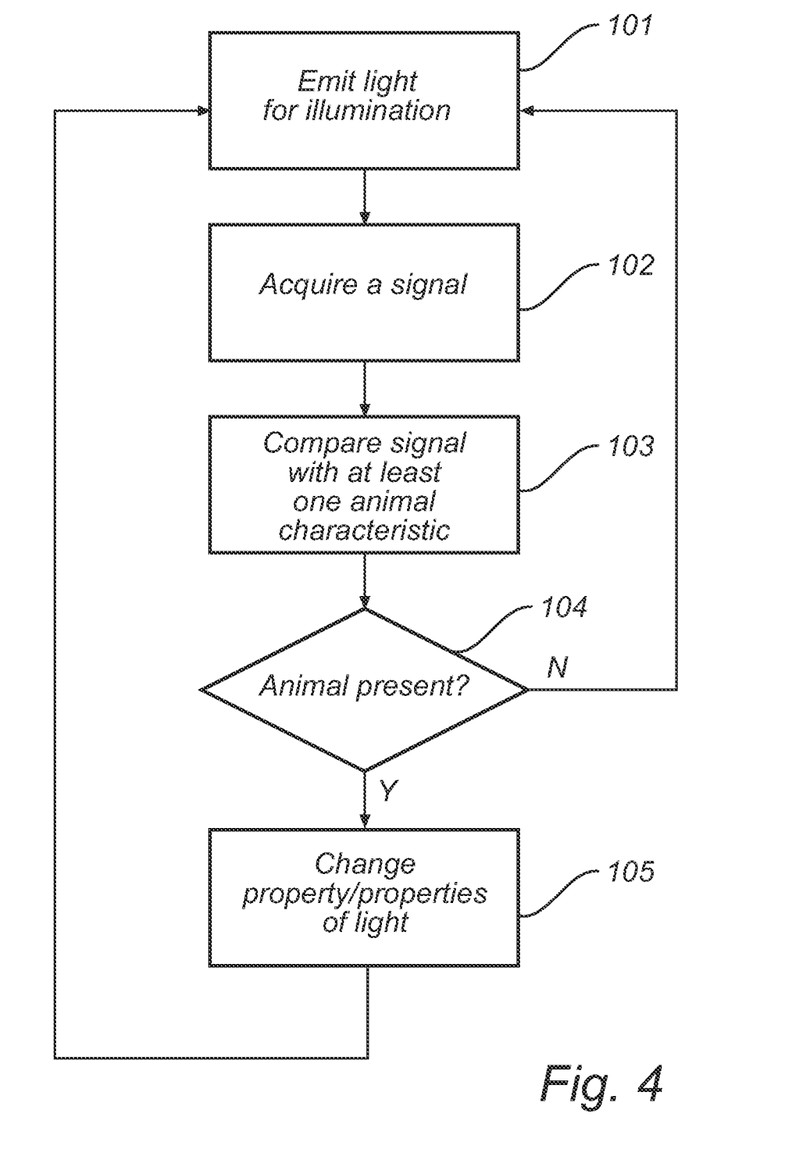
FIG. 4 is a flow-chart schematically illustrating an embodiment of the method according to the present invention FIGS. 5a-d schematically illustrate exemplary characteristics for classifying a signal as an animal indication signal.

Turning back to the flow-chart in FIG. 4, the method proceeds to step 102, in which a signal 6 is acquired using a detector, which may comprise an ultrasound sensor 21 (FIG. 3) to sense ultrasonic signals generated by certain animals.

Following acquisition and optional conditioning of the signal 6 as described above in connection with FIG. 3, the signal is compared with at least one animal characteristic in step 103. In the embodiment of the illumination system illustrated in FIG. 3, the comparison takes place in the microprocessor 26.

Examples of such animal characteristics for the particular case when the acquired signals originate from so-called bat ecolocation are illustrated in FIGS. 5a-d. These particular examples are taken from Raghuram and Marimutu, "Donald Redfield Griffin, the discovery of echolocation", Resonance, February 2005, pages 20-32.

Figure 5A:
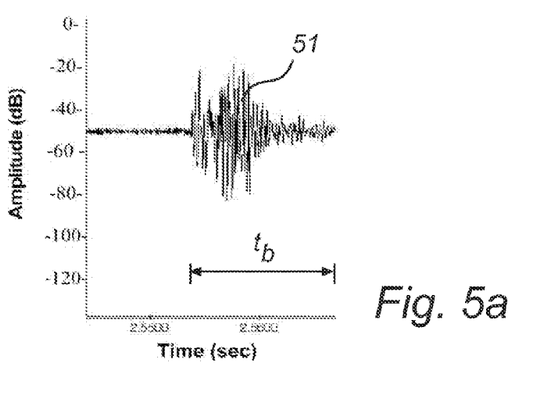

A first characteristic is shown in the graph in FIG. 5a, where the curve 51 illustrates the duration $t_b$ of one of the ultrasound bursts generated by a bat 7.

Figure 5B:
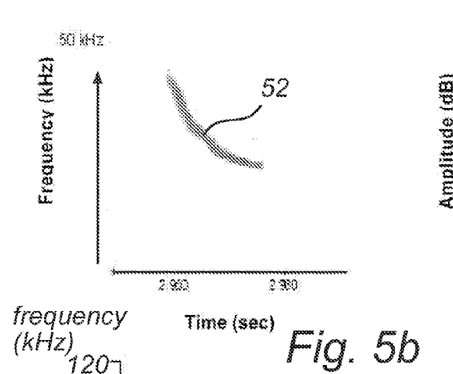

A second characteristic is shown in the graph in FIG. 5b, where the curve 52 illustrates the frequency as a function of time of one of the ultrasound bursts generated by a bat 7.

Figure 5C:
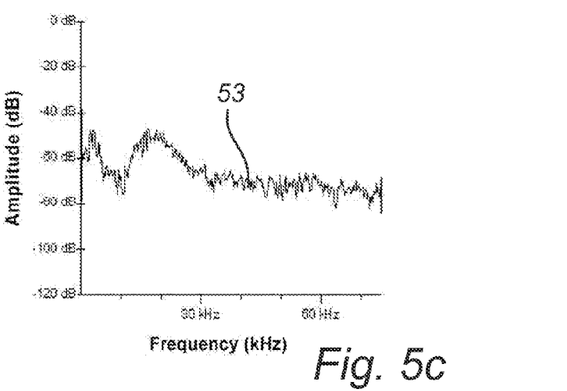

A third characteristic is shown in the graph in FIG. 5c, where the curve 53 illustrates the amplitude as a function of frequency of one of the ultrasound bursts generated by a bat 7.

Figure 5D:
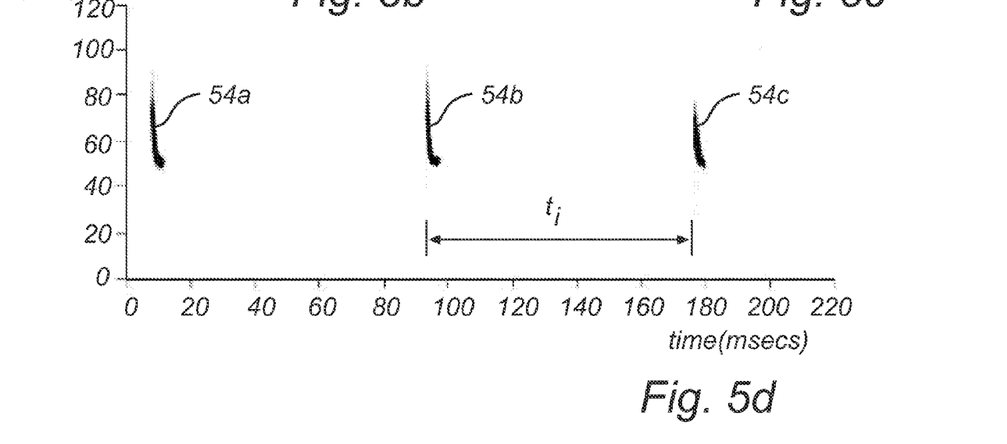

Finally, a fourth characteristic is shown in the graph in FIG. 5d, where the curve segments 54a-c illustrate the time period t, between consecutive ultrasound bursts generated by a bat 7.

Following the comparison carried out in step 103 of the method illustrated in FIG. 4, the method proceeds to step 104, where it is determined whether an animal is present.

By comparing the acquired signal 6 with any one or several of the above-described characteristics and determining that the acquired signal has corresponding properties that are sufficiently close to the stored characteristic, the acquired signal 6 can be classified as an animal indication signal. In this case, when finding a match between the acquired signals and one or several of the characteristics shown in FIGS. 5a-d, the acquired signal 6 can even be classified as indicating the presence of a bat 7.

What is "sufficiently close" may depend on application and on the desired level of certainty. This kind of trade-off is very well known to the person skilled in the art.

If it is determined in step 104 that there is no bat present, the method goes back to step 101 and continues to emit light for illumination.

If, on the other hand, it is determined that there is an animal, such as a bat 7, present, the method proceeds to step 105 to change at least one property of the emitted light.

Continuing with the exemplary embodiment described above in connection with step 101, in which the light is emitted by a combination of cool-white LEDs 29a-b (FIG. 3) and red-orange LEDs 29c-d (FIG. 3), properties of the emitted light can be changed by turning off the cool-white LEDs 29a-b and driving the red-orange LEDs 29c-d at full power.

Figure 7B:
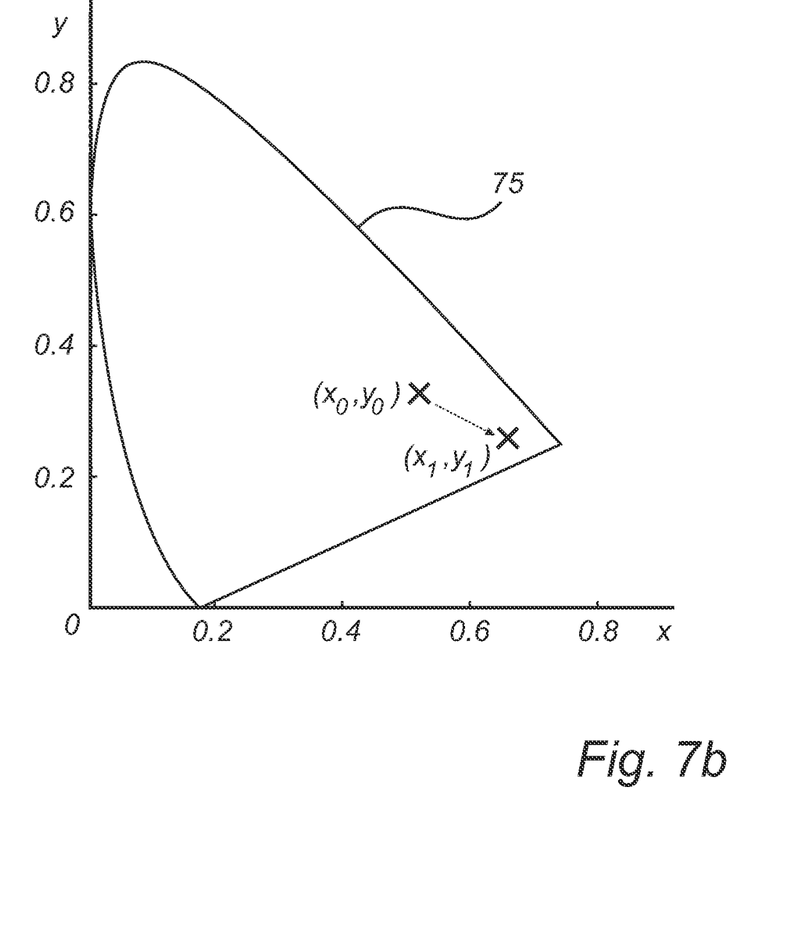

The resulting changed light will have the spectral power distribution given by the curve 72 in FIG. 7a, and the modified color point $(x_1, y_1)=(0.670, 0.330)$ as indicated in FIG. 7b.

If the light-sources 29a-d are configured to generate a light level of 5 1× when in the state illustrated by the curve 71 and the color point $(x_0, y_0)$, turning off the cool-white LEDs 29a-b and driving the red-orange LEDs 29c-d at full power will deliver about 3 1×, which may still be acceptable for illumination for human activities.

For bats 7, however, the perceived reduction in intensity will be far more dramatic, since it is known that the spectral sensitivities of bat photoreceptors have maxima ranging from 350 to 520 nm for the short wavelength receptor and ranging from 509 to 565 nm for the medium wavelength receptor. It is also known that the circadian rhythm of activity of bats is controlled by the same photoreceptors (Joshi, J. Comp. Physiol. A (1985) 156:189-198, Winter et al. Nature, vol. 425, 9 Oct. 2003, page 612-614; Wang et al., Mol. Biol. Evol. 21(2):295-302, 2004).

Figure 6:
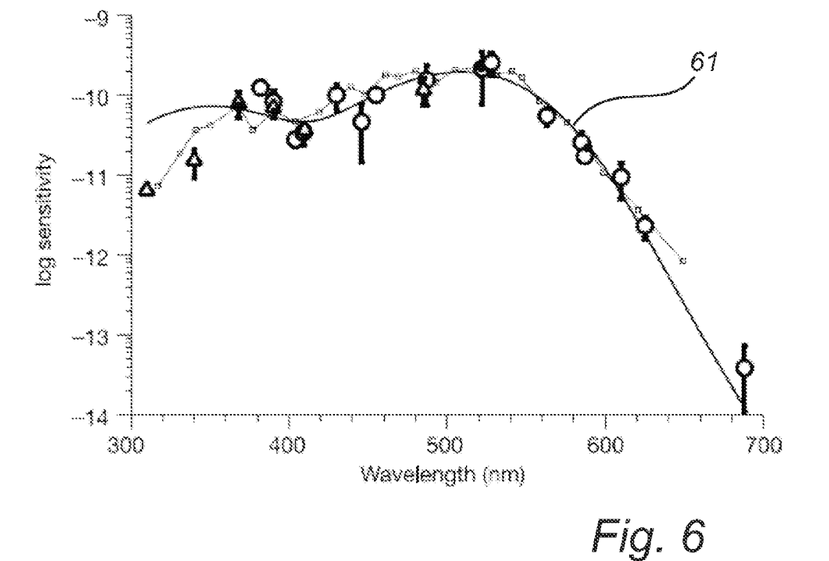
FIG. 6 is a diagram schematically illustrating the spectral sensitivity function of a bat.

As is illustrated by the curve 61 in FIG. 6, the log spectral sensitivity is about –10 between 380 nm and about 560 nm. At 580, the log spectral sensitivity is –10.7. From about 600 nm onwards, the log sensitivity is smaller than –11. This means that to the bat eye, light sources with a wavelength around 580 nm are a factor 5 less bright than light sources emitting between 380 and 560 nm. Above 600 nm, the difference is even a factor 10 or larger.

Accordingly, a change in illumination properties as that described above and illustrated in FIGS. 7a-b would reduce the light intensity as perceived by a bat 7 by a factor of 8 or more.

Hereby, the bat 7 can continue its flight through the light emitted by the illumination system 20. At the same time, the light is only temporarily changed, as is illustrated by the line running from step 105 to step 101 in FIG. 4, from a near optimal illumination for human activities to a somewhat dimmed and color adjusted illumination to allow passage of detected bats.

The person skilled in the art will realize that the present invention is by no means limited to the preferred embodiments. For example, the illumination system according to various embodiments of the invention may have any combination of detector(s), light-emitting device(s) and control device(s). For instance, one control device may control several light-emitting devices based on input from a single detector, or one control device may control each of a plurality of light-emitting devices based on a signal from an associated detector. Moreover, other signals generated by an animal can be used, such as signals indicative of animal movement, whether the movement be by walking, swimming or flying. Additionally, the detecting may detect signals generated through bioluminescence.

The mere fact that certain measures are recited in mutually different dependent claims does not indicate that a combination of these measured cannot be used to advantage. Any reference signs in the claims should not be construed as limiting the scope.

The invention claimed is:

1. An illumination method, comprising the acts of:
   providing illumination;
   detecting a signal;
   comparing said detected signal with a predetermined plurality of signals characteristic of animals; and
   changing at least one property of said illumination in response to an animal characterized by the detected signal.

2. The method according to claim 1, wherein said detected signal is an acoustic signal generated by an animal.

3. The method according to claim 2, wherein said acoustic signal is an ultrasonic signal.

4. The method according to claim 1,
   further comprising the act of classifying the detected signal as being characteristic of animals when the detected signal matches at least one of said predetermined plurality of signals characteristic of animals.

5. The method according to claim 4, wherein said plurality of characteristics is indicative of the presence of particular animal species; and said classifying act identifies the particular animal species of the animal that made the detected signal.

6. The method according to claim 5, further comprising the act of displaying information about said particular animal species.

7. The method according to claim 1, wherein said at least one property is selected from a color point and light intensity of the illumination perceived by said animal.

8. The method according to claim 1, wherein said changing act is only performed within predetermined time periods depending on an expected level of human activity within an illuminated area.

9. The control device according to claim 1, wherein said processor is further configured to change said at least one property of said illumination within predetermined time periods depending on an expected level of human activity within an illuminated area.

10. A system comprising:
    at least one light emitting device for providing illumination;
    at least one a detector for detecting a signal; and
    a control device connectable to the at least one light-emitting device and the at least one detector, said control device
    comprising a processor and a memory for storing a predetermined plurality of signals characteristic of animals,
    wherein the processor is
    configured to:
       acquire the signal detected by said detector;
       compare said detected signal with said predetermined plurality of signals characteristic of animals;
       when said detected signal and at least one of said predetermined plurality of signals characteristic of animals match, classify said detected signal as made by a specific animal; and
       control said light-emitting device to change at least one property of the illumination in response to said specific animal.

11. The control device according to claim 10, wherein said plurality of signals characteristic of animals is indicative of presence of a particular animal species, and said processor is further configured to classify said detected signal indicative of the presence of an animal belonging to said particular animal species.

12. The control device according to claim 10, wherein said processor is further configured to change a color point and light intensity of the illumination perceived by said animal species.

13. An illumination system comprising:
    a light-emitting device for providing illumination;
    a detector configured to detect a signal; and
    a control device connected to said light-emitting device and said detector for controlling said light-emitting device to change at least one property of the illumination in response to the detected signal indicating a presence of an animal indication,
    wherein the control device is configured to
       acquire the detected signal,
       compare said detected signal with said predetermined plurality of signals characteristic of animals, and
       when said detected signal and at least one of said predetermined plurality of signals characteristic of animals match, classify said detected signal as made by a specific animal.

14. The illumination system according to claim 13, wherein said detector is an ultrasound detector for detecting an ultrasonic signal generated by said specific animal.

15. A non-transitory computer readable medium comprising a computer program, when executed by a processor, configure the processor to perform an illumination method for providing illumination by a light-emitting device connectable to a control device, the control device being connectable to a detector for detecting a signal, comprising acts of:
    acquiring the signal detected by said detector;
    comparing said detected signal with a predetermined plurality of signals characteristic of animals;
    when said detected signal and at least one of said predetermined plurality of signals characteristic of animals match classifying said detected signal as made by a specific animal; and
    controlling said light-emitting device to change at least one property of the illumination in response to said specific animal.

* * * * *